US012387554B2

(12) United States Patent
Coon et al.

(10) Patent No.: US 12,387,554 B2
(45) Date of Patent: Aug. 12, 2025

(54) USER INPUT DECK FOR A GAMING MACHINE

(71) Applicant: LNW Gaming, Inc., Las Vegas, NV (US)

(72) Inventors: Robert Coon, Chicago, IL (US); Christian Kulujian, Chicago, IL (US)

(73) Assignee: LNW Gaming, Inc., Las Vegas, NV (US)

(*) Notice: Subject to any disclaimer, the term of this patent is extended or adjusted under 35 U.S.C. 154(b) by 300 days.

(21) Appl. No.: 18/329,762

(22) Filed: Jun. 6, 2023

(65) Prior Publication Data

US 2024/0071170 A1 Feb. 29, 2024

Related U.S. Application Data

(60) Provisional application No. 63/402,198, filed on Aug. 30, 2022.

(51) Int. Cl.
*G07F 17/00* (2006.01)
*G07F 17/32* (2006.01)

(52) U.S. Cl.
CPC ...... *G07F 17/3216* (2013.01); *G07F 17/3209* (2013.01); *G07F 17/3211* (2013.01)

(58) Field of Classification Search
None
See application file for complete search history.

(56) References Cited

U.S. PATENT DOCUMENTS

| | | | | |
|---|---|---|---|---|
| 5,556,286 | A | 9/1996 | Ikesugi et al. | |
| 5,611,535 | A * | 3/1997 | Tiberio | G07F 17/34 463/20 |
| D406,865 | S | 3/1999 | Heidel | |
| 6,334,612 | B1 | 1/2002 | Wurz et al. | |
| D459,402 | S | 6/2002 | Wurz et al. | |
| D464,377 | S | 10/2002 | Wurz et al. | |
| 6,517,433 | B2 | 2/2003 | Loose et al. | |
| 6,722,979 | B2 | 4/2004 | Gilmore et al. | |
| D495,754 | S | 9/2004 | Wurz et al. | |
| D495,755 | S | 9/2004 | Wurz et al. | |
| D508,268 | S | 8/2005 | Hanchar et al. | |
| 6,937,298 | B2 | 8/2005 | Okada | |
| D509,254 | S | 9/2005 | Rasmussen et al. | |
| D512,105 | S | 11/2005 | Chitrapongse et al. | |
| 7,097,560 | B2 | 8/2006 | Okada | |
| 7,140,963 | B2 | 11/2006 | Kojima | |
| 7,159,865 | B2 | 1/2007 | Okada | |

(Continued)

*Primary Examiner* — Paul A D'Agostino

(57) ABSTRACT

A gaming machine for operating a wagering game comprises a user input deck and an emotive lighting structure. The user input deck includes a transmissive panel, a plurality of light sources, and an etched graphic. The plurality of light sources is constructed and arranged to transmit light into the transmissive panel via an edge thereof. The etched graphic is etched into a surface of the transmissive panel and is illuminated by the transmitted light. The emotive lighting structure is configured to present content related to the wagering game. The user input deck is disposed between the emotive lighting structure and a player position in front of the gaming machine. The emotive lighting structure extends below a height of the user input deck such that at least a portion of the content is visible through the transmissive panel.

17 Claims, 6 Drawing Sheets

(56) References Cited

U.S. PATENT DOCUMENTS 7,160,187 B2 1/2007 Loose et al.
7,169,048 B2 1/2007 Nozaki et al.
D539,854 S 4/2007 Luciano et al.
7,207,883 B2 4/2007 Nozaki et al.
7,219,893 B2 5/2007 Tanimura et al.
7,220,181 B2 5/2007 Okada
7,234,697 B2 6/2007 Okada
D549,785 S 8/2007 Luciano, Jr. et al.
7,281,980 B2 10/2007 Okada
7,322,884 B2 1/2008 Emori et al.
7,329,177 B1 * 2/2008 Hui .......................... G07F 17/32 463/11
7,329,181 B2 2/2008 Hoshino et al.
D564,600 S 3/2008 Greenberg et al.
D564,601 S 3/2008 Strahinic et al.
D566,197 S 4/2008 Greenberg et al.
7,355,660 B2 4/2008 Ikeda
7,390,259 B2 6/2008 Okada
D572,314 S 7/2008 Vallejo et al.
7,404,766 B2 7/2008 Adachi et al.
D577,077 S 9/2008 Mitchell et al.
D579,500 S 10/2008 Luciano, Jr. et al.
7,458,890 B2 12/2008 Loose et al.
7,465,228 B2 12/2008 Okada
RE40,625 E 1/2009 Wurz et al.
7,479,061 B2 1/2009 Okada
7,479,066 B2 1/2009 Emori
7,485,039 B2 2/2009 Okada
RE40,671 E 3/2009 Wurz et al.
7,510,475 B2 3/2009 Loose et al.
7,510,476 B2 3/2009 Kobayashi
7,520,812 B2 4/2009 Okada
D595,783 S 7/2009 Anderson
D596,678 S 7/2009 Myers
D597,144 S 7/2009 Myers
D599,858 S 9/2009 Lesley et al.
D599,859 S 9/2009 Lesley et al.
D599,860 S 9/2009 Lesley et al.
7,585,220 B2 9/2009 Loose et al.
7,594,852 B2 9/2009 Rasmussen
D604,368 S 11/2009 Lesley et al.
D613,802 S 4/2010 Meyers et al.
7,695,364 B2 4/2010 Okada
D622,780 S 8/2010 Lesley et al.
D622,781 S 8/2010 Lesley et al.
D622,782 S 8/2010 Chudek et al.
7,775,888 B2 8/2010 Wudtke
D646,336 S 10/2011 Kelly et al.
D646,337 S 10/2011 Kelly et al.
8,105,161 B2 1/2012 Rasmussen
8,216,051 B2 7/2012 Rasmussen
8,231,464 B2 7/2012 Gelber et al.
8,376,839 B2 2/2013 Lesley et al.
D678,955 S 3/2013 Lesley et al.
D678,956 S 3/2013 Lesley et al.
D678,957 S 3/2013 Cesaroni et al.
D678,958 S 3/2013 Cesaroni et al.
D681,130 S 4/2013 Lesley et al.
8,408,998 B2 4/2013 Rasmussen et al.
D682,948 S 5/2013 Cesaroni et al.
D685,033 S 6/2013 Wudtke
8,502,936 B2 8/2013 Rasmussen et al.
D691,665 S 10/2013 Chudek
D691,666 S 10/2013 Lesley et al.
D697,558 S 1/2014 Myers et al.
8,636,579 B2 1/2014 Hornik et al.
8,684,808 B2 4/2014 Aoki et al.
D704,273 S 5/2014 Chudek
D704,275 S 5/2014 Lesley et al.
D706,359 S 6/2014 Wudtke
D706,741 S 6/2014 Myers
8,777,757 B2 7/2014 Chudek
D712,975 S 9/2014 Lesley et al.
D714,392 S 9/2014 Arabian
8,840,464 B1 9/2014 Brunell et al.
D714,875 S 10/2014 Wudtke et al.
D715,364 S 10/2014 Wudtke et al.
8,968,088 B2 3/2015 Brunell et al.
D729,321 S 5/2015 Arabian
D740,888 S 10/2015 Depalma et al.
D742,974 S 11/2015 Lesley et al.
D742,975 S 11/2015 Myers et al.
9,330,525 B2 5/2016 Rasmussen et al.
RE46,169 E 10/2016 Kelly et al.
9,659,432 B2 5/2017 Castro et al.
D808,354 S 1/2018 Castro et al.
D812,146 S 3/2018 Castro et al.
D812,147 S 3/2018 Castro et al.
D812,148 S 3/2018 Castro et al.
D812,149 S 3/2018 Castro et al.
D819,747 S 6/2018 Castro et al.
10,019,868 B2 * 7/2018 Castro .................. G02B 6/0006
10,068,412 B2 9/2018 Brunell et al.
D832,355 S 10/2018 Castro et al.
D832,356 S 10/2018 Castro et al.
D832,357 S 10/2018 Castro et al.
D832,358 S 10/2018 Castro et al.
10,096,202 B2 10/2018 Castro et al.
D836,164 S 12/2018 Castro et al.
D842,933 S 3/2019 Castro et al.
D843,458 S 3/2019 Castro et al.
D843,459 S 3/2019 Castro et al.
D843,460 S 3/2019 Castro et al.
D843,461 S 3/2019 Castro et al.
D843,462 S 3/2019 Castro et al.
D843,463 S 3/2019 Castro et al.
D843,464 S 3/2019 Castro et al.
D843,465 S 3/2019 Castro et al.
D843,466 S 3/2019 Castro et al.
D843,474 S 3/2019 Lesley et al.
D843,475 S 3/2019 Lesley et al.
D843,476 S 3/2019 Lesley et al.
D843,477 S 3/2019 Lesley et al.
D843,478 S 3/2019 Lesley et al.
D843,479 S 3/2019 Castro et al.
D843,480 S 3/2019 Castro et al.
D844,062 S 3/2019 Lesley et al.
D871,506 S 12/2019 Castro et al.
10,521,999 B1 12/2019 Itkis et al.
D872,188 S 1/2020 Bernard et al.
D872,189 S 1/2020 Bernard et al.
D873,921 S 1/2020 Bernard et al.
D877,811 S 3/2020 Bernard et al.
D878,477 S 3/2020 Bernard et al.
D880,608 S 4/2020 Glenn, II et al.
D880,609 S 4/2020 Bernard et al.
D880,610 S 4/2020 Glenn, II et al.
D880,611 S 4/2020 Glenn, II et al.
D880,612 S 4/2020 Bernard et al.
D880,613 S 4/2020 Bernard et al.
D880,614 S 4/2020 Bernard et al.
D880,615 S 4/2020 Bernard et al.
D881,284 S 4/2020 Glenn et al.
D881,285 S 4/2020 Glenn et al.
D881,995 S 4/2020 Bernard et al.
D882,694 S 4/2020 Glenn et al.
D882,695 S 4/2020 Glenn et al.
D882,696 S 4/2020 Lesley et al.
D882,697 S 4/2020 Lesley et al.
D882,698 S 4/2020 Lesley et al.
D882,699 S 4/2020 Bernard et al.
D882,700 S 4/2020 Wudtke et al.
D883,393 S 5/2020 Bernard et al.
D884,079 S 5/2020 Glenn, II et al.
10,775,549 B2 9/2020 Thompson
10,789,805 B2 9/2020 Castro et al.
10,846,981 B2 * 11/2020 Ambrecht ........... G07F 17/3209
10,984,629 B2 4/2021 Glenn et al.
11,037,395 B2 * 6/2021 Ozaki ................. G07F 17/3216
11,069,179 B2 * 7/2021 Glenn ..................... G02B 6/001
11,288,916 B2 * 3/2022 Coon .................. G07F 17/3209
11,348,400 B2 5/2022 Coon et al.
11,798,345 B2 * 10/2023 Barbour .............. G07F 17/3211
12,315,327 B2 * 5/2025 Whelan ............... G07F 17/3227

(56) References Cited

U.S. PATENT DOCUMENTS

2005/0239546 A1 10/2005 Hedrick et al.
2006/0009286 A1* 1/2006 Durham .............. G07F 17/3211 463/30
2006/0189387 A1* 8/2006 Rigsby .................... G07F 17/32 463/37
2006/0205504 A1 9/2006 Okada
2006/0281559 A1 12/2006 Luciano
2008/0039213 A1 2/2008 Cornell et al.
2008/0096655 A1 4/2008 Rasmussen et al.
2008/0182652 A1 7/2008 Rasmussen et al.
2008/0188293 A1 8/2008 Rasmussen et al.
2008/0254880 A1 10/2008 Dreyer et al.
2008/0261703 A1* 10/2008 Luciano .............. G07F 17/3216 463/46
2009/0117977 A1 5/2009 Gelber et al.
2009/0131145 A1 5/2009 Aoki et al.
2009/0131148 A1 5/2009 Loose et al.
2009/0149242 A1* 6/2009 Woodard ............ G07F 17/3211 463/21
2009/0181758 A1 7/2009 Loose et al.
2009/0227357 A1 9/2009 Rasmussen
2009/0286589 A1 11/2009 Rasmussen
2010/0029368 A1 2/2010 Hornik et al.
2010/0124968 A1* 5/2010 Hoffman ............. G07F 17/3265 463/20
2010/0124994 A1 5/2010 O'Keene et al.
2010/0252997 A1* 10/2010 Walker .................... G07F 17/32 273/292
2013/0116809 A1* 5/2013 Carpenter ........... G07F 17/3225 700/92
2013/0137523 A1 5/2013 Lesley et al.
2014/0094252 A1 4/2014 Kato et al.
2015/0087401 A1 3/2015 Glenn, II et al.
2015/0087404 A1 3/2015 Lesley et al.
2015/0148134 A1 5/2015 Brunell et al.
2016/0093142 A1* 3/2016 Lamb .................. G07F 17/3213 463/20
2016/0335836 A1* 11/2016 Castro ................. G07F 17/3211
2017/0053478 A1 2/2017 Wudtke et al.
2018/0075689 A1* 3/2018 Castro ...................... A63F 13/28
2018/0089954 A1* 3/2018 Carpenter ........... G07F 17/3262
2018/0204416 A1 7/2018 Perea-Ochoa
2018/0313977 A1* 11/2018 Newton ................. G02B 5/021
2019/0080549 A1* 3/2019 Lewis .................... G06F 3/0202
2020/0111295 A1* 4/2020 Glenn .................. G02B 6/0018
2020/0175809 A1* 6/2020 Jadeja ................. G07F 17/3239
2021/0019986 A1* 1/2021 Urban ...................... F21V 3/049
2021/0090383 A1* 3/2021 Rodriguez .......... G07F 17/3216
2021/0112645 A1* 4/2021 Knipp ................... F21V 33/008
2021/0192889 A1 6/2021 Banas et al.
2021/0295638 A1* 9/2021 Urban ................. G07F 17/3211
2021/0312757 A1* 10/2021 Taylor ................. G07F 17/3225
2021/0322595 A1* 10/2021 Colvin ...................... A61L 9/20
2021/0338864 A1* 11/2021 Urban ................. G07F 17/3216
2021/0343119 A1* 11/2021 Colvin ................ G07F 17/3267
2021/0375094 A1* 12/2021 Thomas .............. G07F 17/3244
2022/0254221 A1 8/2022 Coon et al.
2024/0096168 A1* 3/2024 Jadeja ................. G07F 17/3211
2025/0109845 A1* 4/2025 Kliger ................. G07F 17/3202

* cited by examiner

USER INPUT DECK FOR A GAMING MACHINE

RELATED APPLICATIONS

This patent application claims priority benefit to U.S. Provisional Patent Application No. 63/402,198, filed Aug. 30, 2022. The disclosure of the 63/402,198 application is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates generally to gaming machines and methods of operating the same and, more particularly, relates to a user input deck for operating a gaming machine.

BACKGROUND OF THE INVENTION

The competitive landscape among gaming machine suppliers is fueled by accelerated product life cycles, increased product supply, continued entry of competitors, and increased investment in advanced development resources. To compete in the space of premium gaming machines with more expensive or extravagant components, suppliers have sought to differentiate such gaming machines with unique hardware configurations, game play mechanics, and third-party branded content. Such hardware configurations may include one or more large display devices in a landscape and/or portrait orientation, emotive lights surrounding the display devices, audio speakers that deliver a surround-sound audio experience, and a large user input deck with video and/or mechanical buttons for operating the game.

As suppliers continue to offer a variety of premium gaming machines, a need exists for a premium gaming machine that further differentiates from the competition.

SUMMARY OF THE INVENTION

According to an embodiment of the present invention, a gaming machine for operating a wagering game comprises a user input deck and an emotive lighting structure. The user input deck includes a transmissive panel, a plurality of light sources, and an etched graphic. The plurality of light sources is constructed and arranged to transmit light into the transmissive panel via an edge thereof. The etched graphic is etched into a surface of the transmissive panel and is illuminated by the transmitted light. The emotive lighting structure is configured to present content related to the wagering game. The user input deck is disposed between the emotive lighting structure and a player position in front of the gaming machine. The emotive lighting structure extends below a height of the user input deck such that at least a portion of the content is visible through the transmissive panel.

According to another embodiment of the present invention, a method of operating the gaming machine with the user input deck is disclosed herein.

Additional aspects of the invention will be apparent to those of ordinary skill in the art in view of the detailed description of various embodiments, which is made with reference to the drawings, a brief description of which is provided below.

Figure 1:
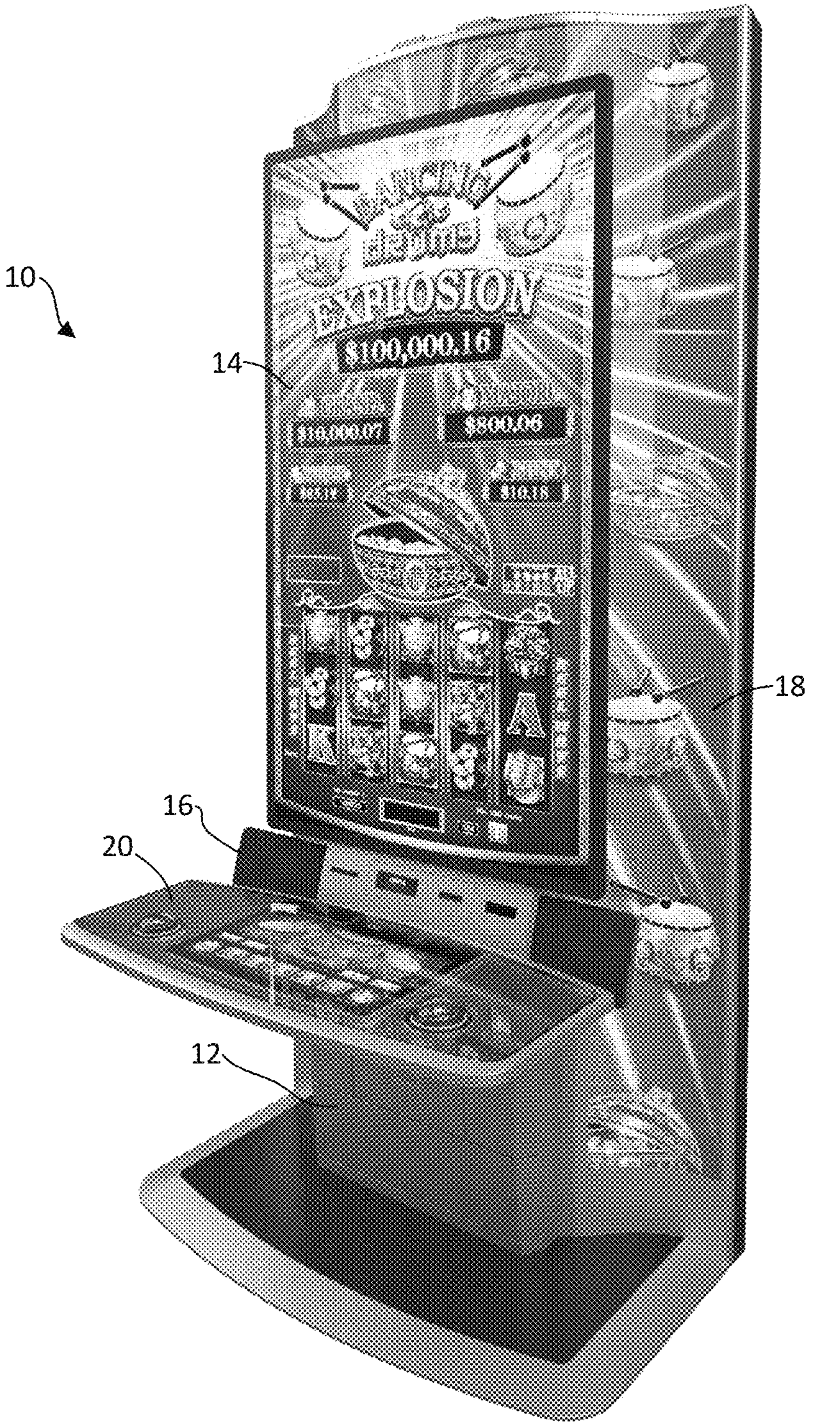
FIG. 1 is a perspective view of a gaming machine in operation according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

The term "controller" may refer to a single physical controller or a set of controllers that operate in conjunction with each other and may or may not be located in the same enclosure inside the gaming machine. The types of controllers may include a central processing unit (CPU), a graphics processing unit, peripheral sub-controllers (e.g., an LED controller, a touchscreen controller, a value input device controller, a value output device controller, etc.), any combination of processors, etc. The controller may include specialized game-logic circuitry that has been approved by a gaming regulatory authority for deployment in the jurisdiction governed by that authority.

Figure 2:
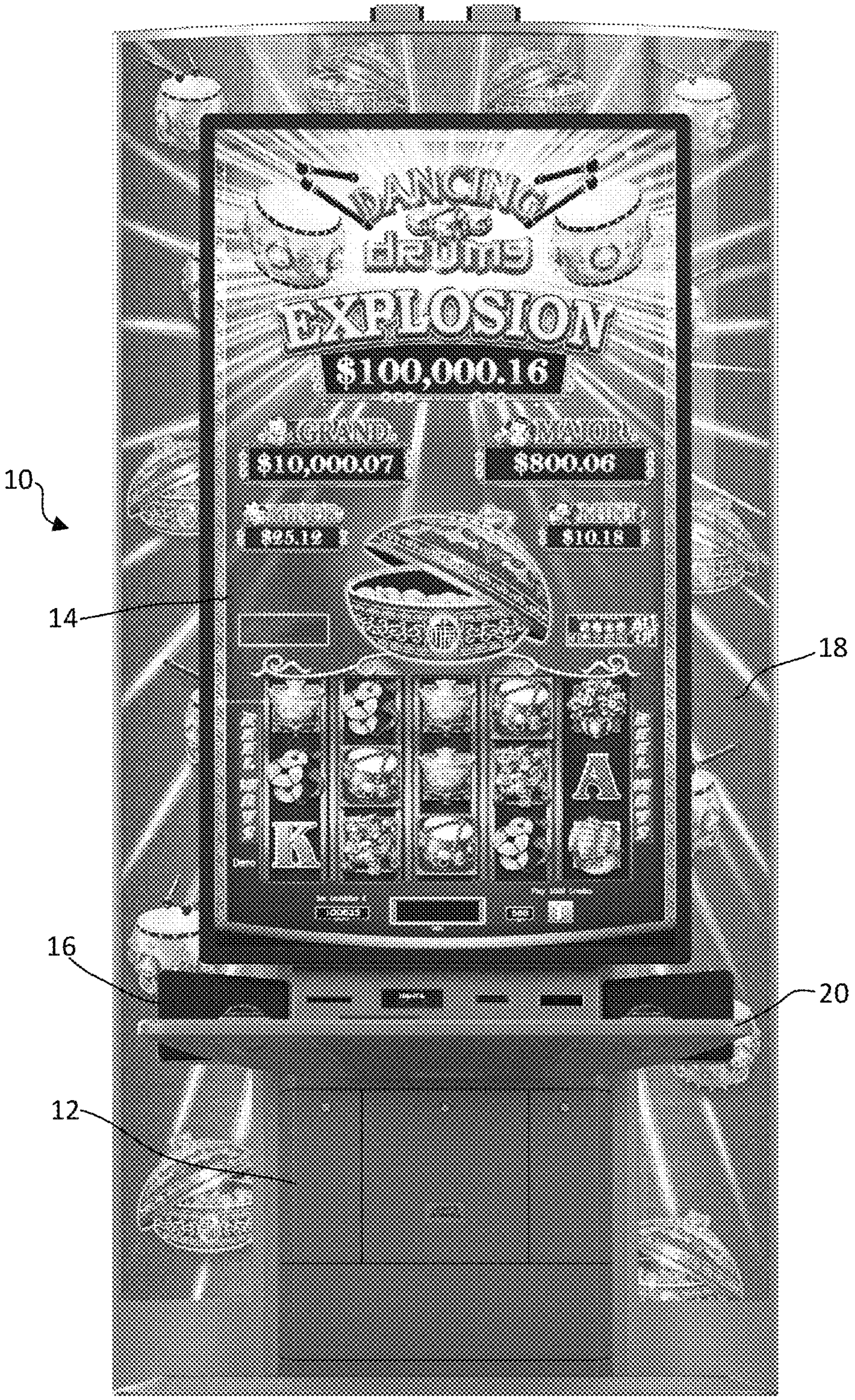
FIG. 2 is a front view of the gaming machine.
Figure 3:
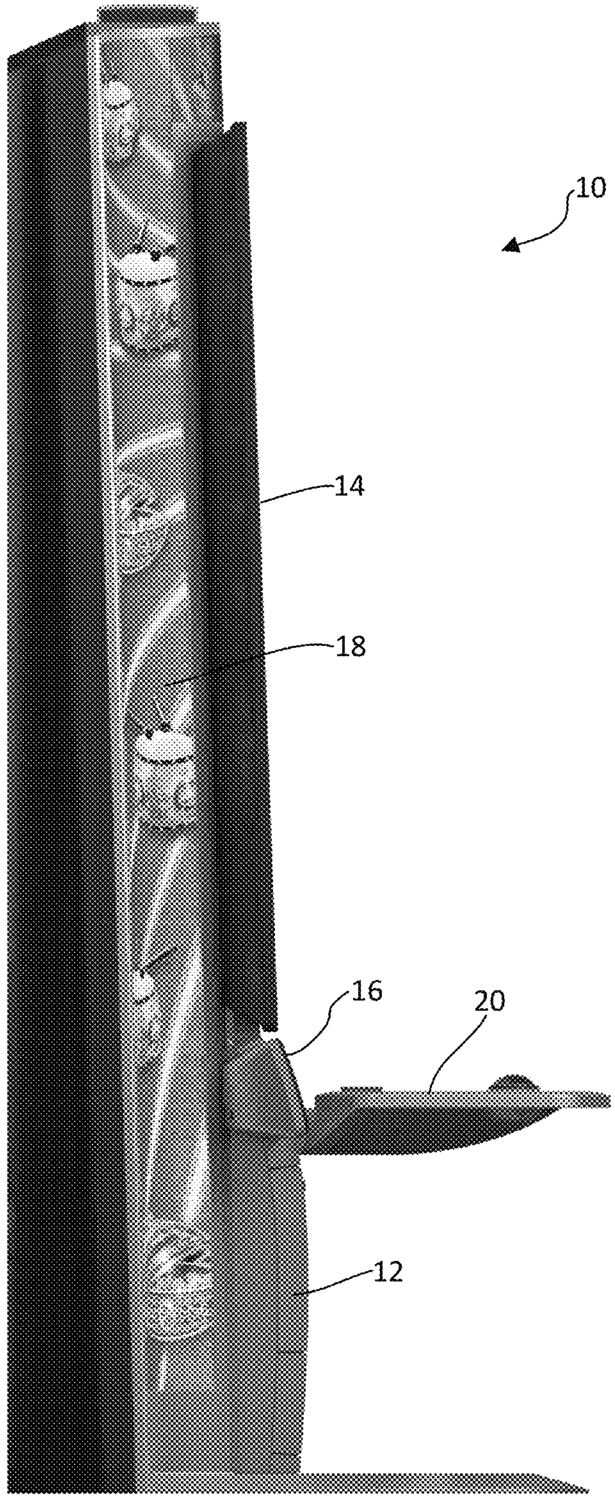
FIG. 3 is a left side view of the gaming machine.

Referring to FIGS. 1-3, there is shown a gaming machine 10 according to an embodiment of the present invention. The gaming machine 10 may be an electromechanical gaming terminal configured to play mechanical slots, or a video gaming terminal configured to play a video casino wagering game, such as slots, keno, poker, blackjack, roulette, craps, etc. The gaming machine 10 comprises a cabinet 12, a video display device 14, an interface panel 16, an emotive trim lighting structure 18, and a cantilevered user input deck 20. The cabinet 12 extends from a bottom to a top of the gaming machine 10 (see FIG. 3) and may comprise one or more enclosures. The cabinet 12 contains a controller for operating the wagering game and managing peripherals of the gaming machine 10. The cabinet 12 may also contain auxiliary equipment such as value input devices (e.g., bill/ticket acceptor) for funding the wagering game, value output devices (e.g., ticket printer/dispenser) for cashing out a game credit balance, and audio components (e.g., amplifier and subwoofer). The video display device 14 is mounted to the cabinet 12 by hooks, hinges, latches, fasteners, or the like. The video display device 14 may be flat, faceted, or curved and may be oriented in a landscape or portrait configuration. In the illustrated embodiment, the video display device 14 is a 75" flat, high-definition LCD or OLED oriented in a portrait configuration. The interface panel 16 is mounted to the cabinet 12 and disposed below the video display device 14 and behind the user input deck 20. The interface panel 16 extends partially below a height/elevation of the user input deck 20. The interface panel 16 carries a pair of audio speakers to deliver a stereo- or surround-sound audio experience. Between the pair of audio speakers, the interface panel 16 may also carry a player-tracking display, a USB port, and ports for accepting and/or dispensing currency, tickets, and/or cards.

The emotive lighting structure 18 is recessed relative to the video display device 14. The emotive lighting structure 18 partially surrounds the video display device 14 and comprises a series of micro light-emitting-diode (LED) display panels bearing content related to the wagering game. The content may be active graphics and/or simple lighting. The series of micro-LED display panels includes 15 LED display panels along the left side of the video display device 14, 15 LED display panels along the right side of the video display device 14, and two LED display panels across the top of the video display device 14. The two top LED display panels extend between the topmost LED display panels along the left and right sides of the video display device 14.

Figure 4:
FIGS. 4, 5, and 6 are close-up top perspective views of a user input deck of the gaming machine in operation, wherein the views showing different examples of LED-illuminated etched graphics in a transmissive panel of the user input deck.
Figure 7:
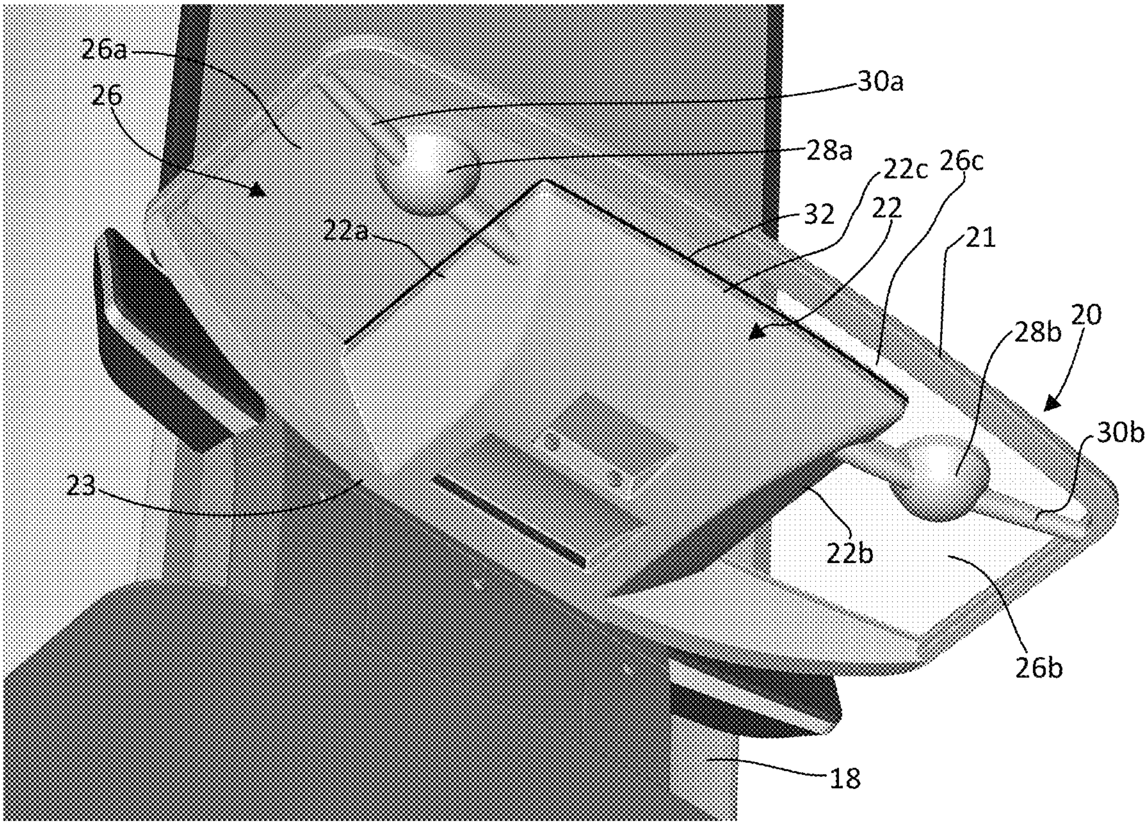
FIG. 7 is a close-up bottom perspective view of the user input deck of the gaming machine.

Referring to FIGS. 4 and 7, the cantilevered user input deck 20 extends horizontally from the cabinet 12 (see FIG. 3) towards a player seated in front of the gaming machine 10 such that the deck appears to be floating in air. The user input deck 20 is mounted to the cabinet 12 by hooks, hinges, latches, fasteners, or the like and is encompassed by a cast metal frame 21. To power and communicate with any electronic components of the user input deck 20, power and data cables may run between the user input deck 20 and the controller in the cabinet 12 via a rear connector 23.

The user input deck 20 comprises a video display device 22, a pair of inductive mobile phone chargers 24 (see FIG. 4, which also shows a player's mobile device on the left charger), a transmissive panel 26, and a pair of electromechanical push-buttons 28*a-b*. The pair of chargers 24 are disposed along a rear side of the video display device 22. The transmissive panel 26 is composed of a glass or acrylic material, and the glass may be tempered. The term "transmissive" as used herein means that the panel is transparent or translucent, but not opaque, such that a player viewing the panel 26 from one side thereof (e.g., from the perspective shown in FIGS. 4-6) can see through the panel 26 to the other side thereof. For example, as described below, content in the form of lit graphics or lighting from the portions of the emotive lighting structure 18 below the height of the panel 26 are visible to a player looking through the panel 26. The video display device 22 is positioned in a U-shaped cutout in the transmissive panel 26. In particular, the transmissive panel 26 includes left and right panel sections 26*a-b* on opposite sides 22*a-b* of the video display device 22 and a strip section 26*c* extending between the panel sections 26*a-b*. The strip section 26*c* runs along a front side 22*c* of the video display device 22. The left and right panel sections 26*a-b* enable the player, while playing the wagering game, to see through to the micro-LED display panels of the emotive lighting structure 18 which are below the height/elevation of the user input deck 20. The LED display panels bear content, such as special effects, related to the wagering game. The panel sections 26*a-b* have circular mounting apertures that contain the respective push-buttons 28*a-b* such that the buttons appear to be suspended in air. The push-buttons 28*a-b* are preferably located proximate a front edge of the user input deck 20 so that they can easily be reached and operated by the player. For a slot game, the player may press or "mash" either push-button 28*a* or 28*b* to initiate a spin of the slot reels.

Although the user input deck 20 comprises the transmissive panel 26, the deck 20 is constructed to support substantial weight (e.g., at least 300 pounds) at its outer edges and corners. In particular, the user input deck 20 includes a pair of cast metal ribs 30*a-b* (see FIG. 7) extending between the video display device 22 and the respective front left and right corners of the frame 21. Electrical wiring may run through the ribs 30*a-b* to power the push-buttons 28*a-b* and transmit control signals between the controller and the buttons. The ribs 30*a-b* are constructed and arranged to minimize impact on the player's sightlines through the transmissive panel 26 to the portions of the emotive lighting structure 18 below the height/elevation of the user input deck 20.

In the illustrated embodiment, the video display device 22 is a 24" flat, high-definition LCD or OLED oriented in a landscape configuration. The video display device 22 is outfitted with a touchscreen and bears touch keys enabling the player to operate the wagering game, including but not limited to selecting different wager amounts, selecting different numbers of active paylines (for slot games with paylines), bringing up help and pays, calling a service attendant, and cashing out the player's balance on a game credit meter. The video display device 22 may also present at least a portion of an outcome of the wagering game.

Figure 8:
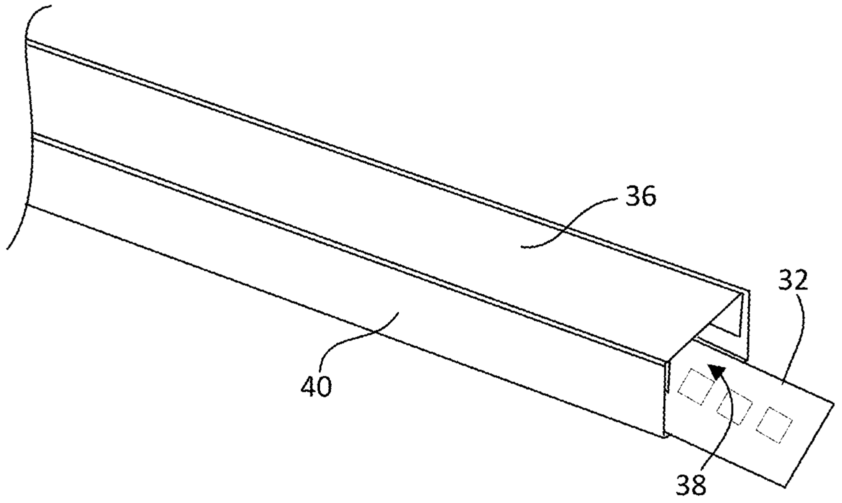
FIG. 8 is an enlarged three-dimensional view of an LED strip inside a diffuser.

To attract players to the gaming machine 10 and further differentiate it from other premium machines on a casino floor, the user input deck 20 includes an LED lighting structure. The LED lightning structure comprises a continuous U-shaped flexible strip 32 of red, blue, and green (RGB) LED's and an etched graphic 34. The LED strip 32 is mounted in a continuous channel that runs along the three sides 22*a*-*c* of the video display device 22. The LED's of the strip 32 may face the transmissive panel 26 to transmit light directly into the interior of the transmissive panel 26 via an adjacent edge of the panel 26. Instead of transmitting light directly into the interior of the transmissive panel 26, the LED's of the strip 32 may instead direct light onto a reflective or refractive surface that, in turn, reflects or refracts the received light into the interior of the transmissive panel 26. To diffuse the light entering the transmissive panel 26, the LED strip 32 may be enclosed or covered with a diffuser, or the adjacent edge of the panel 26 through which the light enters the panel 26 may be frosted. Referring briefly to FIG. 8, there is shown an enlarged three-dimensional view of an exemplary flexible LED strip 32 covered by a diffuser 36 and mounted in a channel 38. The channel 38 may be formed, for example, within the sides 22*a*-*c* of the video display device 22, or may be formed by an aluminum bar(s) 40 that, in turn, is inserted into a channel formed within the sides 22*a*-*c* of the video display device 22.

Returning to FIGS. 4 and 7, to transmit and contain the light received from the LED's, the upper and lower surfaces of the transmissive panel 26 are smooth and polished (except as described below). The transmissive panel 26 may have a thickness ranging from 3 mm to 5 mm. A second unitary transmissive panel (not shown) optionally overlays both the transmissive panel 26 and the video display device 22 to create a seamless upper surface to the user input deck 20. This second panel likewise contains circular apertures, aligned with the mounting apertures in the transmissive panel 26, to expose the push-buttons 28*a*-*b*.

Figure 5:
Figure 6:

To generate a graphic with the LED's of the strip 32, the lower/bottom surface of the transmissive panel 26 is etched with the desired graphic 34 using surface etching, carving, and/or shading techniques. As light from the LED's propagates through the transmissive panel 26, the etched graphic 34 catches and diffracts the light outwards, thereby illuminating the etched graphic 34 while the rest of the transmissive panel remains more uniformly transparent or translucent. In FIG. 4, the LED-illuminated etched graphic 34 comprises a pattern of round dots that radiate outwardly from the sides 22*a*-*c* of the video display device 22 and fade near the push-buttons 28*a*-*b* and the front portion of the frame 21. In FIG. 5, the LED-illuminated etched graphic 34 comprises a pattern of diamonds that radiate outwardly from the sides 22*a*-*c* of the video display device. The size of the diamonds decreases, and the spacing of the diamonds increases, as the diamonds get farther away from the sides 22*a*-*b*. In FIG. 6, the LED-illuminated etched graphic 34 comprises streaks of varying lengths that emanate horizontally from the sides 22*a*-*b* of the video display device. The etched graphic 34 may have many other designs. The RGB LED's of the strip 32 are capable of producing millions of hues of light and are individually addressable. Via an LED sub-controller, the controller may control the LED's in different states of the wagering game to have different lighting modes, such as waves, sequential, slow glow, chasing/flashing, fading slowly, twinkle/flashing, and steady-on. The chosen mode may be synchronized with the current audio and/or video content presented in the wagering game. The controller may cause the LED's to illuminate a color(s) that complements or matches the dominant color(s) displayed on the video display device 22 and/or the video display device 14. If the etched graphic 34 occupies central portions of the transmissive panel sections 26*a*-*b*, that portion of the etched graphic 34 preferably is of low enough density to minimize interference with the player's sightlines through the transmissive panel 26 to the portions of the emotive lighting structure 18 below the height/elevation of the user input deck 20.

The gaming machine 10, including but not limited to the cabinet 12, the video display device 14, the interface panel 16, the emotive lighting structure 18, the user input deck 20, and their relative positioning, may use alternative designs to achieve the same functionality described herein. For example, while maintaining the transmissive panel 26 and LED lighting structure in the user input deck 20, the shapes, locations, quantities, and types of those and other components in the user input deck 20 may be varied from what is illustrated in the drawings. Instead of, or in addition to, residing along the sides of the video display device 22, the LED lighting structure including the LED strip 32) may reside along an inside edge of the frame 21 (except for the portion of the frame 21 behind the video display device 22) and be constructed and arranged to transmit light into the transmissive panel 26 via an adjacent outer edge thereof. The etched graphic 34 may radiate inwardly from the frame 21 instead of outwardly from the video display device 22.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine for operating a wagering game, comprising:

a user input deck including a transmissive panel, a plurality of light sources, and an etched graphic, the plurality of light sources being constructed and arranged to transmit light into the transmissive panel via an edge thereof, the etched graphic being etched into a surface of the transmissive panel and being illuminated by the transmitted light; and an emotive lighting structure configured to present content related to the wagering game, the user input deck disposed between the emotive lighting structure and a player position in front of the gaming machine, the emotive lighting structure extending below a height of the user input deck such that at least a portion of the content is visible through the transmissive panel while the etched graphic is illuminated;

wherein the user input deck includes a display device, a frame, and one or more ribs, the frame encompassing the transmissive panel, the one or more ribs being connected to both the frame and the display device and being immediately below the transmissive panel, and wherein the user input deck includes an electromechanical push-button within the transmissive panel and along one of the one or more ribs, the one of the one or more ribs carrying electrical wiring to the push-button.

2. The gaming machine of claim 1, further including a second display device configured to present the wagering game, the emotive lighting structure at least partially surrounding the second display device and including a series of micro light-emitting-diode (LED) display panels.

3. The gaming machine of claim 2, further including a cabinet, wherein the second display device, the emotive lighting structure, and the user input deck are mounted to the cabinet, the user input deck extending horizontally from the cabinet towards the player position.

4. The gaming machine of claim 1, wherein the plurality of light sources includes a strip of light-emitting diodes (LED's).

5. The gaming machine of claim 4, wherein the strip of LED's are disposed along one or more sides of the display device, the etched graphic radiating outwardly from the one or more sides of the display device.

6. The gaming machine of claim 5, wherein the LED's of the strip face the transmissive panel.

7. The gaming machine of claim 1, wherein the user input deck includes a diffuser positioned to diffuse the light before it enters the transmissive panel.

8. A user input deck for a gaming machine, the gaming machine including an emotive lighting structure configured to present content related to a wagering game, the user input deck disposed between the emotive lighting structure and a player position in front of the gaming machine, the emotive lighting structure extending below a height of the user input deck, the user input deck comprising:

- a transmissive panel;
- a plurality of light sources constructed and arranged to transmit light into the transmissive panel via an edge thereof,
- a graphic etched into a surface of the transmissive panel and being illuminated by the transmitted light, at least a portion of the content on the emotive lighting structure being visible through the transmissive panel while the etched graphic is illuminated;
- a display device, a frame, and one or more ribs, the frame encompassing the transmissive panel, the one or more ribs being connected to both the frame and the display device and being immediately below the transmissive panel; and
- an electromechanical push-button within the transmissive panel and along one of the one or more ribs, the one of the one or more ribs carrying electrical wiring to the push-button.

9. The user input deck of claim 8, wherein the user input deck is mounted to a cabinet of the gaming machine and extends horizontally from the cabinet towards the player position.

10. The user input deck of claim 8, wherein the plurality of light sources includes a strip of light-emitting diodes (LED's).

11. The user input deck of claim 10, wherein the strip of LED's are disposed along one or more sides of the display device, the etched graphic radiating outwardly from the one or more sides of the display device.

12. The user input deck of claim 11, wherein the LED's of the strip face the transmissive panel.

13. The user input deck of claim 8, further including a diffuser positioned to diffuse the light before it enters the transmissive panel.

14. A method of operating a gaming machine, the gaming machine including a user input deck and an emotive lighting structure, the user input deck including a transmissive panel, a plurality of light sources, and an etched graphic, the etched graphic being etched into a surface of the transmissive panel, the user input deck disposed between the emotive lighting structure and a player position in front of the gaming machine, the emotive lighting structure extending below a height of the user input deck, the user input deck including a display device, a frame, and one or more ribs, the frame encompassing the transmissive panel, the one or more ribs being connected to both the frame and the display device and being immediately below the transmissive panel, the user input deck including an electromechanical push-button within the transmissive panel and along one of the one or more ribs, the one of the one or more ribs carrying electrical wiring to the push-button, the method comprising the operations of:

- presenting content on the emotive lighting structure; and
- transmitting light from the plurality of light sources into the transmissive panel via an edge thereof such that the etched graphic is illuminated by the transmitted light, at least a portion of the content being visible through the transmissive panel while the etched graphic is illuminated.

15. The method of claim 14, wherein the plurality of lights sources includes a strip of light-emitting diodes (LED's) disposed along one or more sides of the display device, the etched graphic radiating outwardly from the one or more sides of the display device.

16. The method of claim 14, wherein the transmitting operation includes diffusing the light with a diffuser before it enters the transmissive panel.

17. The method of claim 14, further including initiating, via the electromechanical push-button within the transmissive panel, a play of a wagering game at the gaming machine.

* * * * *